US007509901B2

(12) United States Patent
Zannini

(10) Patent No.: US 7,509,901 B2
(45) Date of Patent: Mar. 31, 2009

(54) COUPLING OF THE CARTRIDGE OF A CUTTER HOLDER FOR INDUSTRIAL CUTTING

(75) Inventor: Guido Zannini, Milan (IT)

(73) Assignee: Zincometal S.p.A., Inveruno (IT)

( * ) Notice: Subject to any disclaimer, the term of this patent is extended or adjusted under 35 U.S.C. 154(b) by 89 days.

(21) Appl. No.: 11/366,611

(22) Filed: Mar. 3, 2006

(65) Prior Publication Data

US 2006/0201306 A1 Sep. 14, 2006

(30) Foreign Application Priority Data

Mar. 8, 2005 (IT) .......................... MI2005A0358

(51) Int. Cl.
*B23D 19/00* (2006.01)

(52) U.S. Cl. ...................... 83/481; 83/508.3; 83/698.31

(58) Field of Classification Search ................... 83/481, 83/482, 498–507, 508.2, 508.3, 698.11, 698.31, 83/698.41, 698.51; 403/322.4, 324, 325, 403/381; 74/47–50

See application file for complete search history.

(56) References Cited

U.S. PATENT DOCUMENTS 3,945,328 A * 3/1976 Hendrickson et al. ....... 108/132
4,415,189 A * 11/1983 Kastelic, Jr. ................ 292/196
4,741,234 A 5/1988 Colombo et al.
5,058,475 A 10/1991 Tidland et al.
6,155,154 A * 12/2000 Hsu .......................... 83/508.3
6,732,625 B1 * 5/2004 Boynton et al. ............... 83/482

FOREIGN PATENT DOCUMENTS

CA 2 337 556 A1 10/2001

* cited by examiner

*Primary Examiner*—Stephen Choi
(74) *Attorney, Agent, or Firm*—Modiano & Associati; Albert Josif; Daniel J. O'Byrne

(57) ABSTRACT

A system for engaging and locking the cartridge on the body of a cutter holder adapted to equip machines for the industrial cutting of flexible laminates, comprising a slider with a dovetail profile on the lower portion of the cutter holder body, the head portion of the cartridge being provided with a slot with a profile complementary to the profile of the slider for engagement of the cartridge on the cutter holder body, elements for locking the cartridge on the cutter holder body, and a lever for actuating locking elements, which comprise at least one movable element, which applies a symmetrical force with an upward traction component on both sides of the complementary profile of the slot.

12 Claims, 4 Drawing Sheets

COUPLING OF THE CARTRIDGE OF A CUTTER HOLDER FOR INDUSTRIAL CUTTING

The present invention relates to a cutter holder adapted to equip machines for the industrial cutting of flexible laminates, and discloses a system for coupling the cartridge of the cutter to the cutter holder body.

More specifically, the invention relates to a mechanism which is integrated in the body of the cutter holder and allows the engagement and locking of the cartridge on the body of the cutter holder, and to the corresponding means provided on the cartridge which cooperate with such mechanism.

BACKGROUND OF THE INVENTION

Modern systems for industrial cutting comprise several motorized cutting systems, each of which has a plurality of cutters arranged side-by-side and actuated simultaneously by devices which can have an electromagnetic, pneumatic or other operating principle and operate continuously even for three eight-hour shifts, seven days a week, as in the case of paper industries. Currently, scissor-type or pressure-type devices are mostly used to cut laminates, for example paper, plastics, aluminum, two-part elements, and fibers of any sort, from non-wovens to carbon fiber. These devices use a circular cutter, which is mounted on an appropriate cutter holder, which acts by lateral contact with a complementary rotating cutter, in the case of scissor-type cutting, or directly by pressing on the material to be cut, which advances on a contrast roller, in the case of pressure cutting.

A cutter holder of this type is constituted generally by a fixed part, which is installed on the supports, which in turn are fitted on a sliding guide of the industrial cutting machine, which is known as cutter holder body, and by a movable part, known as cartridge, on which the circular cutter is fitted. Such cartridge is engaged detachably on the body of the cutter holder, which is provided with a suitable coupling, and must be removed from it whenever it is necessary to perform maintenance on the blade of the cutter or replace it. Since the cutter holder and the cartridge must work as if they were monolithic with each other, in order to ensure precise and constant execution of the cut over time, the mechanical stresses to which the cutter holder is subjected must not be discharged asymmetrically onto said coupling, on penalty of higher wear of the device and also of the occurrence of dangerous weaknesses. For this reason, the coupling of the cartridge on the cutter holder must be conceived and provided so as to be at once durable and rational for the user, who by means of simple and repeatable actions, and in full safety, must be able to extract the cartridge and reinsert it subsequently, fixing it firmly to the cutter holder body.

Various kinds of coupling of the cartridge on the cutter holder body are known. EP-0562454 discloses a cutting unit for the longitudinal cutting of flexible materials, such as for example paper strips, which is provided with means which allow rapid replacement of the blade holder head. Such head is connected to a vertical pivot, which enters the body of the blade holder and around which said head can turn up to 180°, i.e., perform a reversal. The blade holder head is provided with a T-shaped element, the longer external side of which has a lower portion which receives and locks the arm of the fork, while the shorter side and a side which is adjacent and perpendicular thereto make contact and are locked by means of a screw. By unscrewing such screw, the blade holder head can be removed. Although such a mechanism fully achieves the intended aim, it has certain limitations. First of all, it requires the user to loosen a screw, an operation which is not exactly fast, and especially to act manually in the immediate vicinity of the blade of the cutter, thus exposing himself to the risk of injury, although a housing for partial protection is provided on the circumference of the blade in the inactive condition. Moreover, the head reversal operation does not occur by reversing the position of the head but by way of the rotation of the stem to which the cartridge is coupled, and this occurs by means of appropriate controls located on the upper portion of the cutter holder body.

U.S. Pat. No. 6,732,625 discloses a cutter holder in which the engagement and removal of the cartridge occur by means of a slider with a dovetail profile, which is provided on the body of the cutter holder and on which the cartridge is engaged horizontally, a slot provided with a complementarily shaped profile being provided for this purpose on the head portion of the cartridge. A locking device is also present which can be activated and deactivated manually and consists of a lever provided with a cam, which, when turned about a pivot, pushes with the cam in an oblique direction a locking bar, which like a wedge locks the cartridge on the cutter holder. This mechanism simplifies the removal and reengagement of the cartridge and also allows to turn through 180° the blade of the cutter simply by extracting the cartridge and reinserting it in the inverted position. However, the resulting type of locking is not symmetrical on both sides of the dovetail slider of the cartridge. Moreover, the contact between the pneumatic ducts of the cutter holder body and of the cartridge, which are required in order to allow the partial approach and full approach of the blade, might not maintain a perfect coupling, since a uniform contact pressure between the corresponding horizontal surfaces of the body of the cutter holder and of the cartridge head portion is not provided.

SUMMARY OF THE INVENTION

The aim of the present invention is to provide a system for engaging and locking the cartridge on the cutter holder body which allows a symmetrical distribution of forces on both sides of the head portion of the cartridge.

Within this aim, an object of the present invention is to provide an engagement and locking system in which said locking is ensured by an upward traction force which acts on the head portion of the cartridge, thus ensuring better retention of the joints of the ducts of the pressurized fluid.

Another object of the present invention is to provide an engagement and locking system in which said locking ensures high rigidity in order to withstand the vibrations produced during cutting.

Another object of the present invention is to provide an engagement and locking system which allows high repeatability of the positioning of the cartridge, without the mutual positioning of the cartridge and the cutter holder body undergoing any alteration over time.

A further object of the present invention is to provide an engagement and locking system which is safer, since even in case of failure to operate of the locking mechanism, once the cartridge has been engaged it can no longer disengage autonomously.

A still further object of the present invention is to provide a system for engaging and locking the cartridge on the body of the cutter holder which is provided with actuation elements which are practical and absolutely rational for the operator, so as to help to reduce the probability of human error during setup, start-up and maintenance of the cutting lines.

This aim and these and other objects which will become better apparent hereinafter are achieved by a system for engaging and locking the cartridge on the body of the cutter holder according to the present invention, which comprises the slider provided with the dovetail profile provided on the lower portion of the body of the cutter holder, the head portion of the cartridge provided with the slot with a profile which is complementary with respect to the profile of said slider for the engagement of said cartridge on the body of the cutter holder, means for locking the cartridge on the body of the cutter holder, and a lever for actuating said means, wherein said means for locking the cartridge on the body of the cutter holder comprise at least one movable element, which applies a symmetrical force with an upward traction component on both sides of said profile which is shaped complementarily with respect to said slot.

Preferably, said head portion of the cartridge has seats which are provided on the vertical walls of the slot and are symmetrical with respect to both vertical planes of symmetry of said slot, so as to allow the engagement of the cartridge in two positions, one rotated through a straight angle with respect to the other.

Said means for locking the cartridge on the body of the cutter holder further comprise a crank and a link, which are mutually connected by means of a first hinge, the crank being provided with a seat in which said lever is engaged and being coupled to a portion of said slider by means of a second hinge, which lies in an intermediate position between the seat and said first hinge.

Preferably, the at least one movable element is a transverse pivot which is rigidly coupled to the link and has a horizontal axis which is perpendicular to the axis of said link.

Preferably, a one-way mechanism is provided -which comprises an L-shaped lever which has a button and an end portion and is hinged to the front portion of the slider of the body of the cutter holder by means of said second hinge.

BRIEF DESCRIPTION OF THE DRAWINGS

Further characteristics and advantages of the invention will become better apparent from the following detailed description of a preferred but not exclusive embodiment thereof, illustrated by way of non-limiting example in the accompanying drawings, wherein.

DESCRIPTION OF THE PREFERRED EMBODIMENTS

Figure 1:
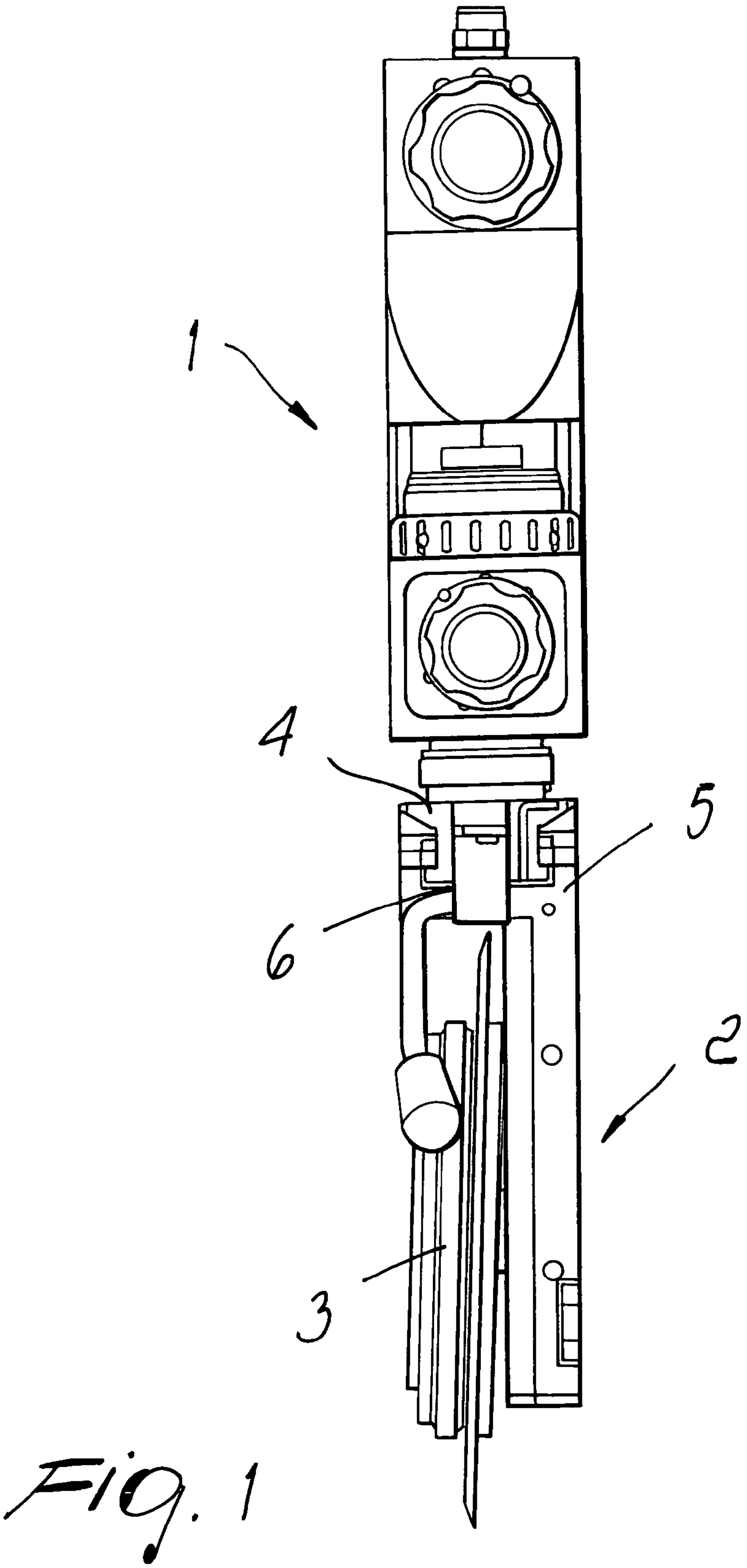
FIG. 1 is a front elevation view of a cutter holder provided with the engagement and locking system according to the present invention.
Figure 2:
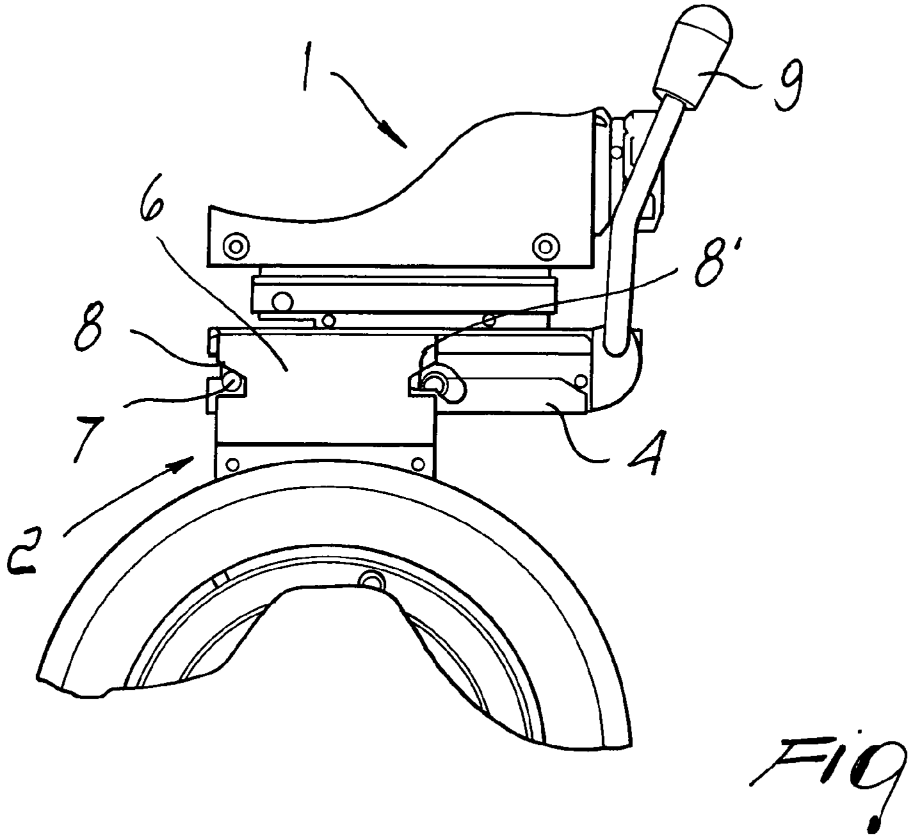
FIG. 2 is a side elevation view of a portion of the cutter holder with the lever raised in the release position.
Figure 3:
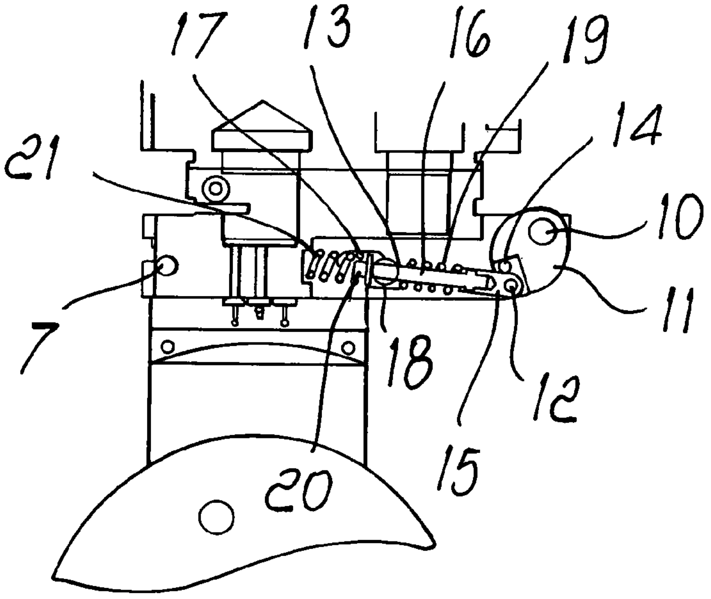
FIG. 3 is a sectional view of FIG. 2, illustrating the details of the locking mechanism.

FIG. 1 illustrates a cutter holder, in which it is possible to distinguish the body of the cutter holder 1 and a removable cartridge 2 on which a cutter 3 is mounted. A dovetail slider 4, which is symmetrical on the right and left sides, is provided on the lower horizontal plane of the body of the cutter holder 1. The head portion 5 of the cartridge is provided with a slot 6, the profile of which is complementary to the profile of the dovetail slider 4, which allows the sliding engagement of the cartridge 2 on the body of the cutter holder 1, locking its degrees of freedom related to rotation about the vertical axis and translational motion along the vertical axis. With reference to FIGS. 2 and 3, on the side walls of the slider 4 there are symmetrically arranged stop pins 7, which are designed to stop the sliding of the slot 6 on the slider 4 in the point where the body of the cutter holder and the cartridge are mutually positioned correctly. For this purpose, the vertical walls of the slot 6 are provided symmetrically with respect to seats 8, 8'. Said seats, two for each side, are symmetrical with respect to both vertical planes of symmetry of the slot 6. This refinement in fact allows to fit the cartridge on the body of the cutter holder from either of the two insertion sides of the slot 6, and therefore obtain a rotation of the cutter through 180° about the vertical axis. The seats 8, 8' have a horizontal base, a vertical wall and an oblique upper wall, so as to have the minimum distance with respect to the base in the innermost point of the seat. Once the cartridge has been inserted in the cutter holder body, therefore, the pins 7 abut against said oblique wall of the seats 8.

FIG. 2 shows that a lever 9 for actuating the locking mechanism is lifted. In this position, the lever 9 is in neutral: in other words, the cartridge 2 is inserted in the cutter holder body 1 but is not locked. By turning downward the actuation lever 9, as can be seen in FIG. 4, the cartridge is also locked on the body of the cutter holder.

Figure 5:
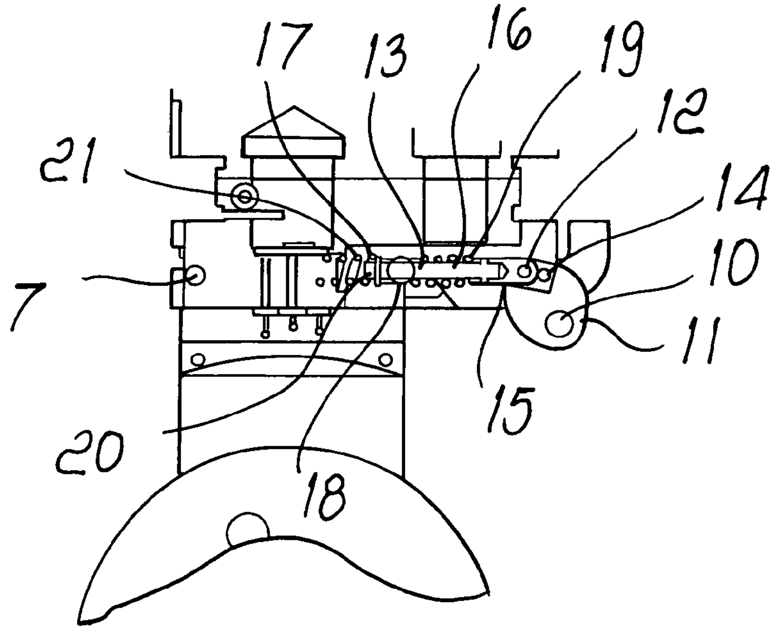
FIG. 5 is a sectional view of FIG. 4, illustrating the details of the locking mechanism.

FIGS. 3 and 5 clearly show the elements that compose the locking mechanism. The actuation lever 9, not shown, is interlocked in a seat 10 of a crank 11. At the opposite end of the crank 11 with respect to the seat 10 a first hinge 12 is provided, which connects the crank 11 to a link 13. The crank 11 is rigidly coupled to the front and central portion of the dovetail slider 4 by means of a second hinge 14, which is in an intermediate position between the seat 10 and the first hinge 12. The link 13 in turn is constituted by a head portion 15, which is pivoted to the crank 11, and by a rod 16. The rod 16 is rigidly coupled to the head portion 15 by means of a threaded coupling. Proximate to the other end of the link 13 there is a transverse pivot 18, the axis of which is horizontal and perpendicular with respect to the axis of the link 13. The pivot 18 is provided, for this purpose, with a central hole, the axis of which is directed like the axis of the link 13, such as to allow the sliding insertion of the link 13. A first spring 19 with a high elastic constant is interposed between the pivot 18 and the head portion 15 of the link 13. The first spring 19 contrasts the sliding of the transverse pivot 18 on the rod 16 of the link 13. Finally, the rod 16 has a flange 17 on which the transverse pivot 18 abuts and a subsequent end pin 20, which is arranged after the transverse pivot 18 and the flange 17 and on which a second spring 21, having a low elastic constant, engages. The second spring 21 allows the actuation lever 9 to keep, when in the neutral condition, a position of equilibrium in which it is raised. The second spring 21 abuts, for this purpose, against the flange 17 and with a vertical wall of the dovetail slider 4 at the opposite end with respect to the pin 20 on which it engages.

Figure 4:
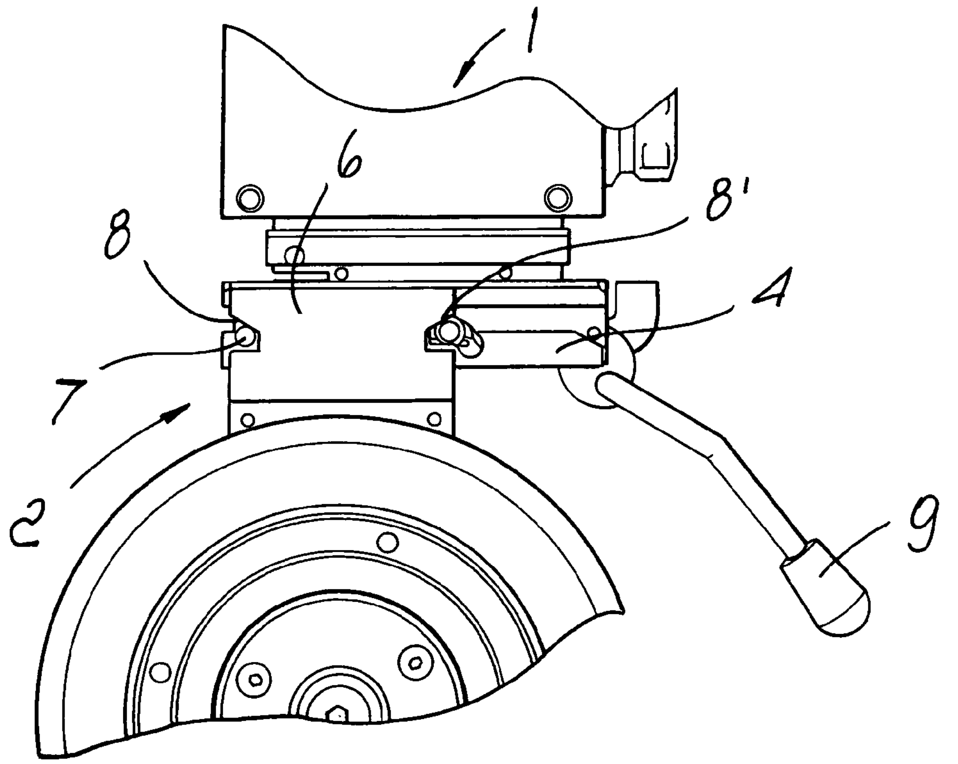
FIG. 4 is a side elevation view of a portion of the cutter holder, with the lever lowered in the locking position.
Figure 6:
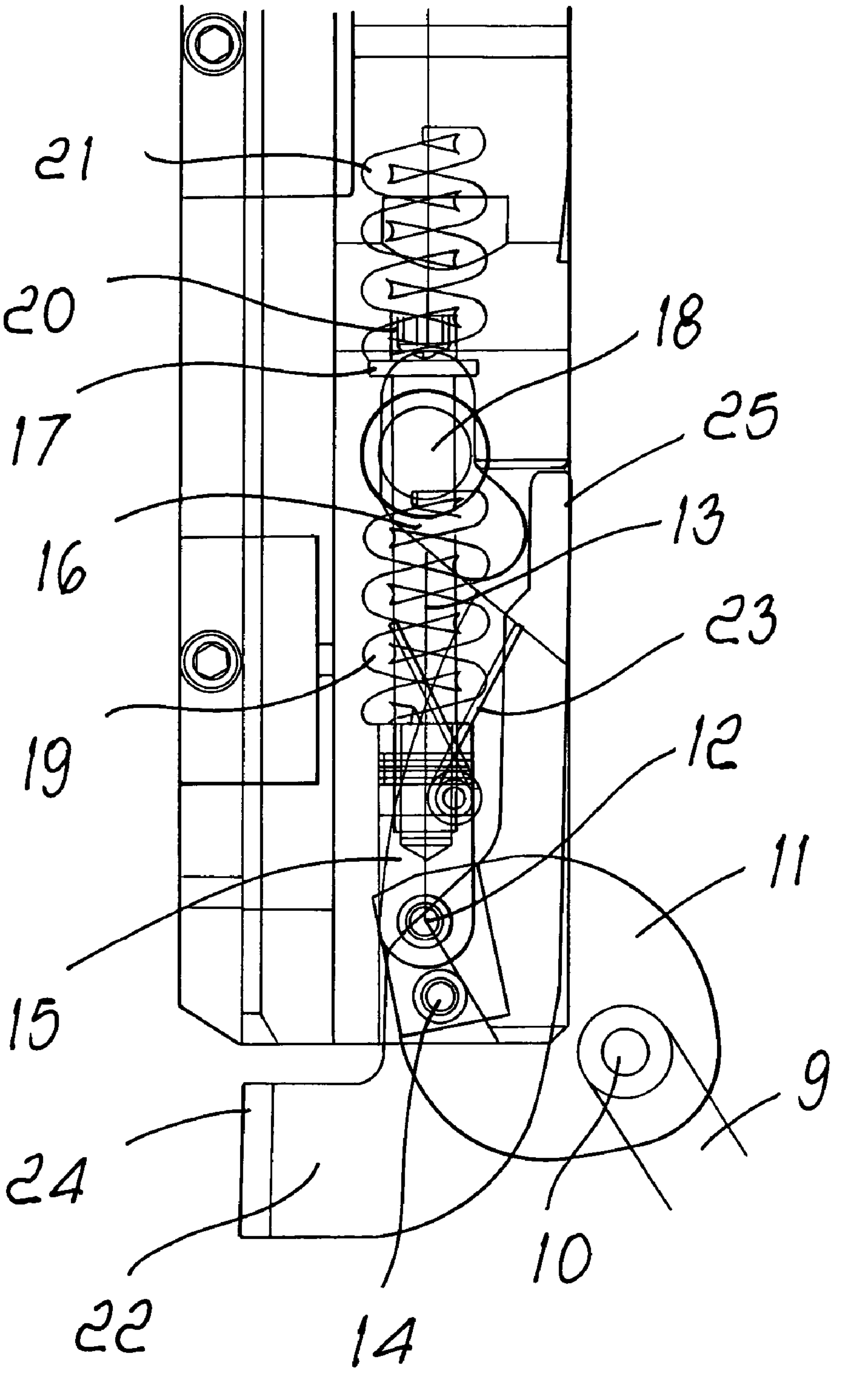
FIG. 6 is a sectional view of the locking mechanism, illustrating the details of the one-way mechanism.

With reference to FIGS. 4, 5 and 6, when the operator turns the lever 9 downward, he turns the crank 11, which is rigidly coupled to the lever 9, about the second hinge 14. The first hinge 12 therefore moves forward and upward, as shown clearly in FIGS. 4 and 5, and the link 13 advances initially rigidly with the transverse pivot 18, overcoming the elastic force of the second spring 21, which is compressed. The transverse pivot 18, advancing along slots provided on the sides of the slider 4, ends its stroke when it encounters the corner between said oblique wall and the vertical wall of the seats 8' provided on the vertical walls of the slot 6 of the cartridge 2. The pivot 18 therefore stops and the link 13 continues to advance by sliding inside it, and simultaneously the advancement of the head portion 15 compresses the first spring 19. Due to a physical law related to inclined planes, there is a component which is directed vertically and upward of the force of contact between the transverse pivot 18 and said oblique walls of the seats 8', which is due to the compression of the first spring 19. Thanks to this force, the cartridge 2 is fixed to the body 1 of the cutter holder by a resultant force which has a traction component which is indeed directed upward. The lever 9, when lowered, remains in this position of equilibrium because, as shown by FIG. 5, the first hinge 12 lies above the second hinge 14 and the elastic return force applied by the first spring 19, which is directed like the axis of the link 13, generates a torque which tends to keep the lever 9 lowered.

In a system of this type, the first spring 19 with rigid elastic constant is capable of giving optimum rigidity to the coupling, such as to withstand the vibration produced by the cutter 3 during cutting.

Should the operator accidentally forget to lower the lever 9 for actuating the locking mechanism, the cutter would begin to cut, and due to the contact forces between the blade of the cutter and the complementary cutter, the cartridge might disengage autonomously. In order to avoid an accident scenario of this type, the engagement and locking system according to the present invention is also provided with a one-way mechanism, which does not allow the cartridge 2 to disengage autonomously from the body of the cutter holder 1 if the lever 9 has remained raised. This one-way mechanism, shown in detail in FIG. 6, comprises a L-shaped secondary lever 22, which is pivoted to the front portion of the slider 4 of the body 1 of the cutter holder by means of the second hinge 14, which retains the crank 11, with respect to which the lever 22 remains on the right. A scissor-like spring 23, by pressing on on the horizontal side of the lever 22, generates a clockwise torque, with respect to FIG. 6, which keeps a button 24 of the lever 22 raised, making the end portion 25 of the lever 22 protrude from the sliding plane of the slider. This end portion abuts against the front vertical wall of the head 5 of the cartridge 2, preventing its accidental disengagement.

It is evident that an engagement and locking system according to the present invention can ensure a distribution of forces which is absolutely symmetrical on both sides of the head of the cartridge, and further that this distribution of forces has a vertical upward traction resultant, which further contributes to improving the contact between the ducts of the pressurized fluid of the body of the cutter holder and the ducts inside the cartridge.

Any variations in the shape, material, number or overall arrangement of the elements which characterize the engagement and locking system do not alter in any way the functional characteristics of the invention, as claimed hereinafter.

The disclosures in Italian Patent Application No. MI2005A000358 from which this application claims priority are incorporated herein by reference.

What is claimed is:

1. A system engaging and locking a cartridge with a head portion on a body of a cutter holder, said system comprising:

a slider provided with a dovetail profile, said slider being arranged on a lower portion of the body of the cutter holder, the head portion of the cartridge being provided with a slot with a profile which is shaped complementary with respect to the dovetail profile of said slider for the engagement of said cartridge on the body of the cutter holder, and said head portion of the cartridge being provided with seats that are arranged on vertical walls of said slot and that are symmetrical with respect to vertical lanes of symmetry of said slot, said seats each having an upper wall that is obliquely shaped;

locking means for locking the cartridge on the body of the cutter holder; and a lever for actuating said locking means, said locking means for locking the cartridge on the body of the cutter holder comprising stop pins that are symmetrically arranged on side walls of said slider, and said locking means further comprising at least one movable transverse pivot element that applies a symmetrical force with an upward traction component on said oblique walls of said seats at both sides of said complementarily shaped profile of said slot.

2. The engagement and locking system of claim 1, wherein said locking means for locking the cartridge on the body of the cutter holder further comprise a crank and a link, said crank and said link being mutually connected by means of a first hinge, the crank being provided with a seat in which said lever engages and being rigidly coupled to a portion of said slider by means of a second hinge, said second hinge being arranged in an intermediate position between said seat and said first hinge.

3. The engagement and locking system of claim 2, further comprising a one-way mechanism is provided for maintaining said cartridge engaged with said body when said lever is in a raised position.

4. The engagement and locking system of claim 3, wherein said one-way mechanism comprises a secondary lever that is L-shaped and is provided with a button and with an end portion, said secondary lever being pivoted to a front portion of the slider of the body of the cutter holder by means of the second hinge.

5. The engagement and locking system of claim 4, wherein said one-way mechanism further comprises at least one scissor-like spring that presses on the secondary lever and generates a torque which keeps said button raised for making said end portion protrude from a sliding surface of the slider.

6. The engagement and locking system of claim 5, wherein said end portion of the lever abuts against a front vertical wall of the head of the cartridge for preventing disengagement of the cartridge.

7. A system engaging and locking a cartridge with a head portion on a body of a cutter holder, said system comprising:

a slider provided with a dovetail profile, said slider being arranged on a lower portion of the body of the cutter holder, the head portion of the cartridge being provided with a slot with profile which is shaped complementary with respect to the dovetail profile of said slider for the engagement of said cartridge on the body of the cutter holder;

locking means for locking the cartridge on the body of the cutter holder; and a lever for actuating said locking means, said locking means for locking the cartridge on the body of the cutter holder comprising at least one movable element, which applies a symmetrical force with an upward traction component on both sides of said complementarily shaped profile of said slot;

said locking means for locking the cartridge on the body of the cutter holder further comprise a crank and a link, said crank and said link being mutually connected by means of a first hinge, the crank being provided with a seat in which said lever engages and being rigidly coupled to a portion of said slider by means of a second hinge, said second hinge being arranged in an intermediate position between said seat and said first hinge;

said at least one movable element being a transverse pivot, said transverse pivot having an axis which is horizontal and perpendicular to an axis of said link and said transverse pivot being provided with a central hole in which said link is slidingly inserted.

8. A system engaging and locking a cartridge with a head portion on a body of a cutter holder, said system comprising:

a slider provided with a dovetail profile, said slider being arranged on a lower portion of the body of the cutter holder, the head portion of the cartridge being provided with a slot with a profile which is shaped complementary with respect to the dovetail profile of said slider for the engagement of said cartridge on the body of the cutter holder;

locking means far locking the cartridge on the body of the cutter holder; and a lever for actuating said locking means, said locking means for locking the cartridge on the body of the cutter holder comprising at least one movable element, which applies a symmetrical force with an upward traction component on both sides of said complementarily shaped profile of said slot;

said locking means for locking the cartridge on the body of the cutter holder further comprise a crank and a link, said crank and said link being mutually connected by means of a first hinge, the crank being provided with a seat in which said lever engages and being rigidly coupled to a portion of said slider by means of a second hinge, said second hinge being arranged in an intermediate position between said seat and said first hinge;

said at least one movable element comprising a transverse pivot, said link comprising a head portion that is hinged to the crank, and said link further comprising a rod, said rod being slidably connected in the transverse pivot, said rod being further provided with a flange, said transverse pivot abutting on said flange, and said rod being further provided with an end pin, said end pin being arranged on the rod adjacent said flange and opposite to said transverse pivot.

9. The engagement and locking system of claim 8, wherein said locking means for locking the cartridge on the body of the cutter holder further comprise at least one first spring that is interposed between said transverse pivot and said head portion of the link.

10. The engagement and looking system of claim 9, wherein said locking means for locking the cartridge on the body of the cutter holder further comprise at least one second spring that engages in said end pin and abuts against the flange and said at least one second spring abuts with a vertical wall of the dovetail slider for keeping said actuation lever raised in an equilibrium position when the lever is in a neutral condition.

11. The engagement and locking system of claim 9, wherein said head portion of the cartridge is provided with seats which are arranged on vertical walls of the slot and are symmetrical with respect to both vertical planes of symmetry of the slot, said seats having a horizontal base, a vertical wall and an upper wall which is oblique, and wherein said transverse pivot is arranged to engage a corner between said oblique wall and said vertical wall of the seats, so that a component of a force of contact between the pivot and said oblique walls is directed vertically and upward.

12. The engagement and locking system of claim 10, wherein said lever, when lowered, remains in the position of equilibrium, with said first hinge lying above said second hinge and an elastic return applied by said first spring that extends along an axis of said link for generating a torque which tends to keep said lever lowered.

* * * * *